United States Patent [19]

Anger et al.

[11] Patent Number: 5,434,616
[45] Date of Patent: Jul. 18, 1995

[54] GOB MEASURING APPARATUS

[75] Inventors: Steven J. Anger, Guelph; William J. Devonshire, Orton; Philip W. Annis, Oakville, all of Canada

[73] Assignee: Erin Technologies, Inc., Ontario, Canada

[21] Appl. No.: 49,501

[22] Filed: Apr. 21, 1993

[51] Int. Cl.⁶ ............................................. H04N 7/18
[52] U.S. Cl. ....................................... 348/92; 348/135
[58] Field of Search .................. 348/91, 92, 94, 135; 382/47; H04N 7/18; 65/29.1, 29.11

[56] References Cited

U.S. PATENT DOCUMENTS

| | | |
|---|---|---|
| 2,948,469 | 8/1960 | Phillips et al. |
| 4,090,241 | 5/1978 | Houston. |
| 4,135,204 | 1/1979 | Davis, Jr. et al. |
| 4,165,975 | 8/1979 | Kwiatkowski et al. ............ 65/29.11 |
| 4,205,973 | 6/1980 | Ryan. |
| 4,342,580 | 8/1982 | Roberson. |
| 4,402,721 | 9/1983 | Ericson et al. .................... 65/29.11 |
| 4,459,146 | 7/1984 | Farkas et al. ...................... 65/29.11 |
| 4,582,522 | 4/1986 | Merz et al. ......................... 65/29.1 |
| 4,905,512 | 3/1990 | Hayashi. |
| 5,119,434 | 6/1992 | Bishop et al. ...................... 348/91 |
| 5,119,435 | 6/1992 | Berkin. |
| 5,170,438 | 12/1992 | Anger et al. |
| 5,236,485 | 8/1993 | Leweringhaus et al. ........... 65/29.1 |

FOREIGN PATENT DOCUMENTS 1055125 10/1953 France.
1423636 3/1969 Germany.
1214614 7/1984 U.S.S.R.

OTHER PUBLICATIONS

Gonzalez, Rafael C., Woods, Richard E., *Digital Image Processing* 1992, pp. 237–240 & Plate V.

Primary Examiner—Tommy P. Chin
Assistant Examiner—Richard Lee
Attorney, Agent, or Firm—Bachman & LaPointe

[57] ABSTRACT

An apparatus for measuring gobs of viscous liquid in free-fall, comprises a video camera adapted to be focused on the path of the gobs so that the gobs fall through the field of view thereof. The video camera is equipped with an electronic shutter for capturing successive two-dimensional, high resolution, frozen video images of the path of the gobs; a digitizer for digitizing the successive images to produce n×n pixel arrays; and an image analyzer for identifying usable gobs in the arrays and analyzing the image in the vicinity of said gobs on a line-by-line basis to locate the edges thereof.

11 Claims, 2 Drawing Sheets

GOB MEASURING APPARATUS

BACKGROUND OF THE INVENTION

This invention relates to an apparatus for measuring gobs of viscous liquid in free fall, particularly gobs of glass falling from the orifice of a glass feeder.

In the manufacture of glass articles, molten glass is first supplied to a gob feeder. This comprises a plunger which forces a molten stream of glass through an orifice where the gobs are separated with shears prior to falling into the hopper of a glass forming machine. In order to control the manufacture of the glass articles, it is important to monitor the weight and shape of the gobs of glass as they fall into the hopper.

One such method is described in U.S. Pat. No. 4,205,973. In this method the gobs fall through laser beams that activate perpendicularly arranged line cameras. These line cameras take successive scans as the gobs fall through their field of view. The successive scans are combined to determine the outline of the falling gob. The system requires careful synchronization of the camera scanning speed with the motion of the gob to ensure that a complete scan is obtained for each passage. A slight variation in the speed of the gobs will cause an error in the measured size since the difference between scanning lines on the image, for a given scanning rate, depends on the velocity of the gob. Furthermore, a separate camera is required for each gob position.

SUMMARY OF THE INVENTION

An object of the invention is to provide an improved apparatus that is not dependent for its accuracy on the constancy of the velocity of the gobs.

Accordingly, the present invention provides an apparatus for measuring gobs of viscous liquid in free-fall, comprising: a video camera adapted to be focused on the path of the gobs so that the gobs fall through the field of view thereof, said video camera being equipped with an electronic shutter for capturing successive two-dimensional, high resolution, frozen video images of the path of the gobs; a digitizer for digitizing said successive images to produce n×n pixel arrays; and an image analyzer for identifying usable gobs in said arrays and analyzing said image in the vicinity of said gobs on a line-by-line basis to locate the edges thereof.

In accordance with the invention, a succession of digitized frozen images are analyzed. A preliminary analysis is carried out to determine whether a particular image contains usable gobs. If so, the image is then further analyzed to determine the outline of the gobs. Unlike the prior art, each useful image obtained from a single camera contains all the information pertaining to a gob, and preferably two or three gobs.

From the outline of the gob, the weight can be determined in accordance with the following formula.

$$\text{Weight} = K \cdot G_{dens} \sum_{y=y1}^{y=y2} \left(\frac{\pi}{4}\right)(\text{Width}(y))^2$$

where
$G_{dens}$ = Density of glass
K = Calibration constant
Width(y) = Width of gob at vertical position y In effect, to obtain the weight of the gob, which is of course proportional to its volume, it is merely necessary to measure the width at each line and multiply the squares of the widths by a constant incorporating a calibration constant and the density of the glass.

The image is preferably a gray scale image, in which case the accuracy of the measurement can be increased by determining the values of the pixels in the vicinity of the edge and interpolating to find the precise location of the edge as a fraction of a pixel.

When a gray scale image is used, the intensities of the pixels can also be mapped to colors so that the relative temperatures of the different parts of the gob can be displayed, with the colder areas showing up as blue and the hotter areas showing up as red.

BRIEF DESCRIPTION OF THE DRAWINGS

The invention will now be described in more detail, by way of example only, with reference to the accompanying drawings, in which.

DESCRIPTION OF THE PREFERRED EMBODIMENTS

Figure 1:
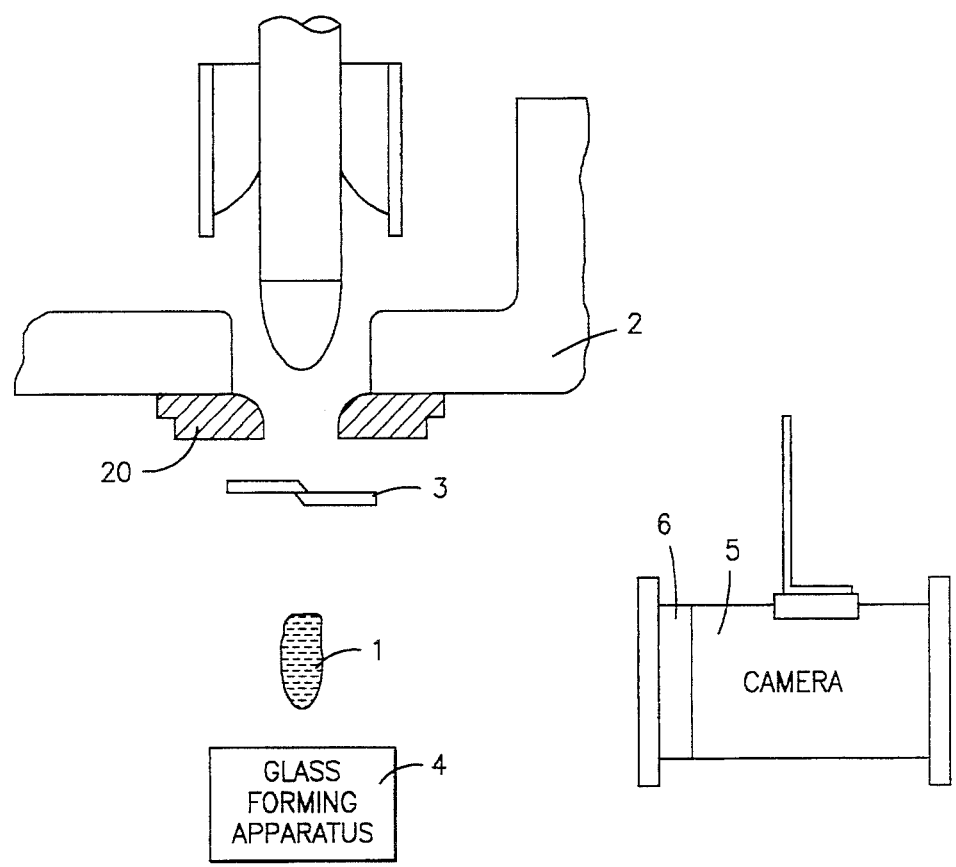
FIG. 1 is an elevational view of a gob feeder showing the camera of the apparatus according to the invention.
Figure 3:
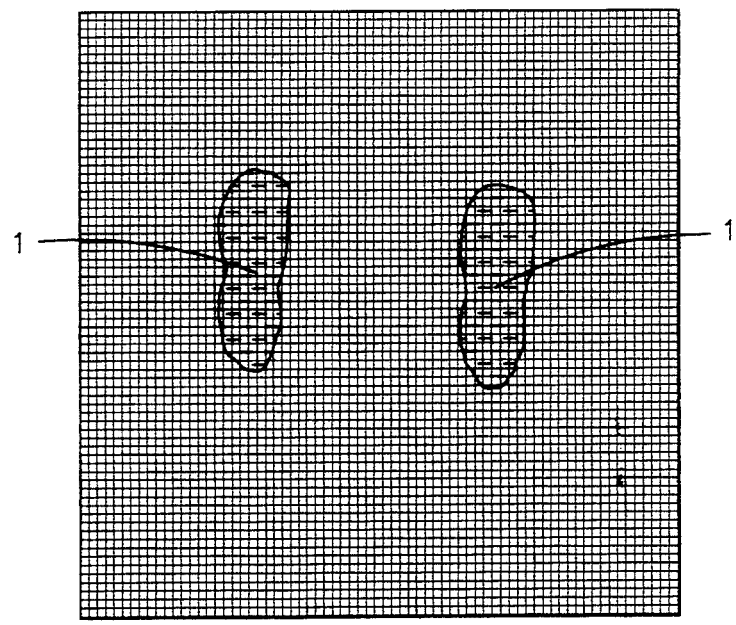
FIG. 3 is a digitized image showing the presence of detected gobs.

Referring now to FIG. 1, gobs 1 fall from the orifice ring 20 of gob feeder 2 after being severed by shears 3. Although one orifice is shown, the gob feeder generally has several orifices arranged side by side. As the gobs fall into glass forming apparatus 4, they pass through the field of view of video camera 5 forming part of the apparatus according to the invention. This takes a succession of images frozen in time of the gobs 1 in free fall (FIG. 3).

Figure 2:
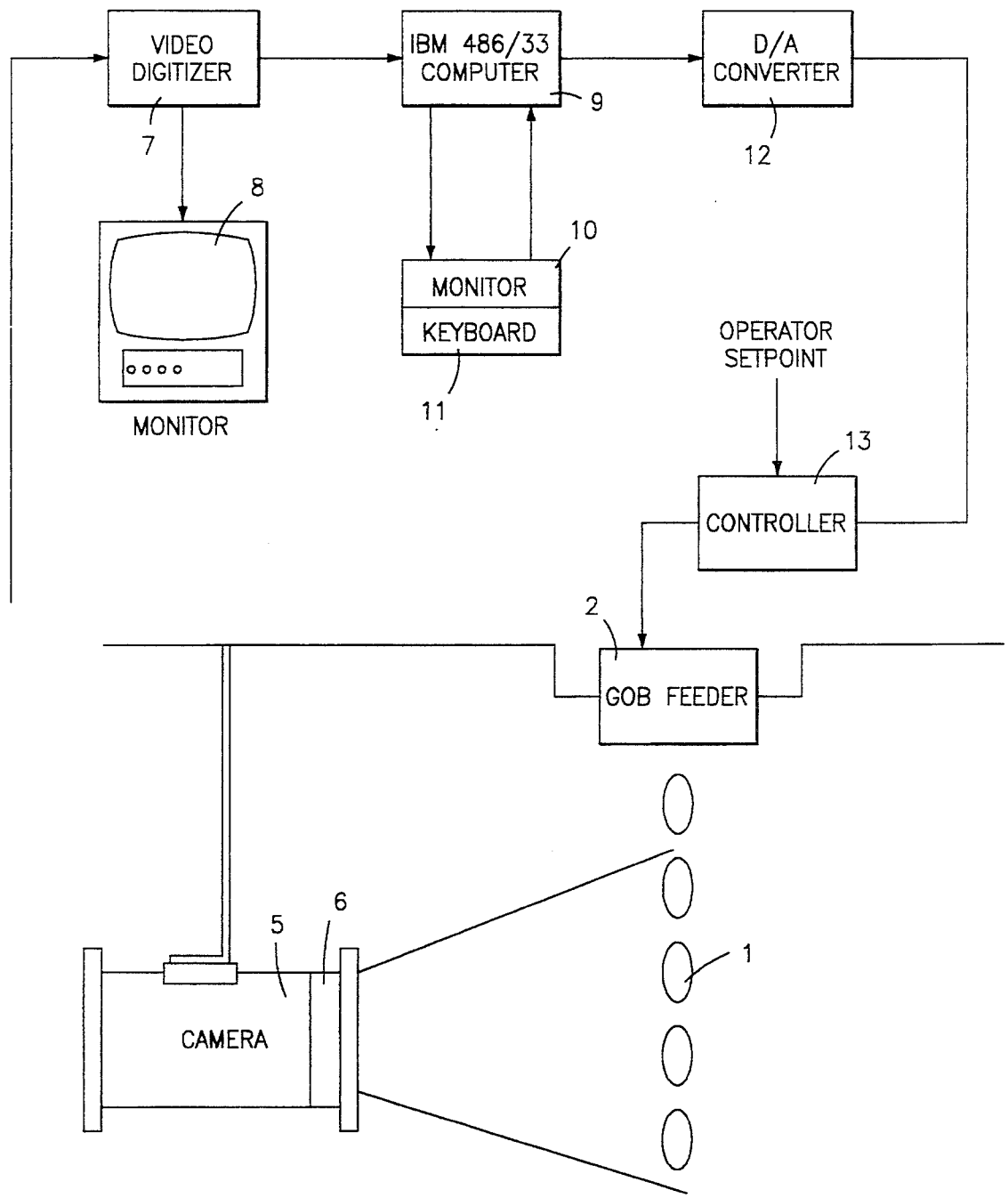
FIG. 2 is a block diagram of the gob measuring apparatus in accordance with the invention.

Turning now to FIG. 2, the video camera 5 is a standard charge-coupled-device (CCD) two-dimensional video camera equipped with an electronic shutter. The camera 5 has a lens system suitable for focusing on the path of the gobs, and in the preferred embodiment this is a 75 mm. manual zoom lens with a two times extender.

The video camera 5 with electronic shutter 6 forms a succession of images of the path of the gobs 1. The scanning speed and the speed of the shutter is selected such that each image effectively freezes the motion of the gobs to create a stationary image. The output of the camera 5 is connected to a video digitizer 7, which for each successive image produces an n by n pixel array, which in the preferred embodiment is 512×512 pixels. While the computer captures a 512×512 interlaced frame, this is separated into two 512×256 fields, which are then analyzed as separate images. Alternatively, a camera with a frame activated shutter could be employed, in which case the image could be analyzed on a frame by frame basis.

This image is displayed on monitor 8. It is also fed to an IBM 33 MHz 486 computer 9 connected to monitor 10 and keyboard 11 for further processing. The computer 9 carries out the following operations on the digitized image:

1) The high resolution image is sub-sampled by extracting every 16th pixel horizontally and vertically to produce a low resolution 32×32 version of the image that is capable of rapid analysis.

2) Each pixel of the low resolution image is analyzed to determine whether it falls above or below a predetermined threshold value. All values above a pre-determined threshold are given a high value and all values below the threshold are given a low value. Thus, a bi-level low resolution image is created.

3) A low resolution, bi-value image is scanned to locate groups of adjacent pixels. Pixel groups within a certain size range are assumed to be valid gobs.

4) If tile number of gobs identified in step 3 meets the predetermined criteria, and none of the gobs touch the edges of the image, the computer 9 proceeds to carry out a full analysis on the high resolution image. If these criteria are not met, the system returns to step 1.

5) Assuming criteria are met, the locations of the gobs in the lower resolution image are stored, and these locations used to determine their corresponding locations in the high resolution version of the image. The image is then scanned in the vicinity of the gobs and the location of the edges determined on a line by line basis.

As the glass is hot, the edge of each gob is actually smeared over several pixels. The edge is determined empirically to lie at a certain point where the intensity has a particular gray scale value. By measuring the values of pixels at several adjacent locations, the precise position of the edge can be determined by linear interpolation as a fraction of pixel pitch as follows:

$$x_{interp} = \left[ \frac{threshold - intens_x}{intens_{x+1} - intens_x} \right] + x$$

where x is the horizontal position below the threshold and x+1 is the horizontal position above the threshold. This is the equation for determining the location of the left edge. A similar equation is used to determine the of location the right edge.

6) At each scanning line, the width of the gob is determined from the distance between the detected edges.

7) Once the edges of the gob have been located, the weights of the gob are calculated from the following formula:

$$Weight = K \cdot G_{dens} \sum_{y=y1}^{y=y2} \left( \frac{\pi}{4} \right)(Width(y))^2$$

where
$G_{dens}$=Density of glass
K=Calibration constant
Width(y)=Width of gob at vertical position y The theoretical weight of the gob is actually given by the integral:

$$Weight = K \cdot G_{dens} \int_{y=y1}^{y=y2} \left( \frac{\pi}{4} \right)(Width(y))^2 dy$$

A more accurate approximation to the integral can be obtained by using Simpson's rule for numerical integration if desired.

Since the vertical spacing of the pixels is constant, the mass of the gob is determined by summing the squares of the widths and multiplying by a constant, which can be determined by calibration of the equipment. It is not necessary to measure the width in perpendicular directions, as was done in the prior art, because it is a reasonable assumption that the gobs are symmetrical about the longitudinal axis due to the physical forces acting on them as they fall into the hopper.

Computer 9 outputs the signal representing the weights to digital-to-analog converter 12, which in turn is connected to a controller 13 controlling the gob feeder 2. The controller 13 can be set at a desired set point by the operator.

The shape of the gobs can be displayed on monitor 10, and furthermore, if desired the weight scale intensities of the pixels can be mapped to colors. In this way, a false colored image of the gobs will show the relative temperature of the various parts. Normally the colder areas are mapped to blue and the hotter areas are mapped to red.

By way of example, a suitable pseudo code for measuring three gobs is as follows:

```
LOOP:
    capture image 512x512
    vmin <-- 255
    vmax <-- 0
        for x <-- 0 to 31
            for y <-- 0 to 31
                image [x,y] <-- digitizer [x/16, y/161]

if (image [x,y] < vmin) vmin <-- image ]x,yl]
                if (image [x,y] > vmax) vmax <-- image [x,y]
            endfor
        endfor if (vmax - vmin < 50)
    goto LOOP threshold <-- (vmin + vmax)/2 for x <-- 0 to 31
        for y <-- 0 to 31
            if (image [x,yl] >= threshold)
                image [x,y] <-- 255
            else
                image [x,y] <-- 0
        endfor
    endfor gobcount <-- 0 for x <-- 0 to 31
        for y <-- 0 to 31
            if ( image [x,y] = 255)
                flood fill position x,y
                floodsize <-- # pixels in flooded region
                minx <-- minimum x value of flood region
                maxx <-- maximum x value of flood region
                miny <-- minimum y value of flood region
                maxy <-- maximum y value of flood region if ( floodsize < 150 or floodsize > 300)
                    goto LOOP if ( minx <= 1 or maxx >= 30)
                    goto LOOP if ( miny <= 1 or maxy >= 30)
                    goto LOOP window_minx [gobcount] = 16 * minx
                window_maxx [gobcount] = 16 * maxx
                window_miny [gobcount] = 16 * miny
                window_maxy [gobcount] = 16 * maxy gobcount <-- gobcount + 1
            endif
        endfor
    endfor if (gobcount ! = 3) goto LOOP for gob <-- 0 to 2
```

-continued

```
minx <— — window_minx (gob)
maxx <— — window_maxx (gob)
miny <— — window_miny [gob]
maxy <— — window_maxy [gob]

image <— — digitizer image from minx,miny to maxx,maxy volume <— — 0 for y <— — 0 to (maxy — miny + 1)
vmin <— — 255
vmax <— — 0 for x <— — 0 to (maxx — minx + 1)
        if (image [x,y] < vmin) vmin <— — image [x,y]
        if (image [x,y] > vmax) vmax <— — image [x,y]
    endfor threshold <— — (vmin + vmax)/2 left <— — 0
    while (image [left,y] < threshold)
    left <— — left + 1 right <— — vmaxx — vminx + 1
    while (image [right,y] < threshold)
    right <— — right — 1 left <— — (threshold — image[left-1,y])/
        (image[left,y] image[left-1,y]) + left — 1 right <— — (threshold — image[right,y])/
        (image[right+1,y] — image[right,y]) + right volume <— — volume + (PI/4) * (right — left) ^ 2 weight [pos] <— — calibration_const * volume endfor output average of weight[0], weight[1], weight[2] to D/A endfor
```

A more complete example of a suitable program to implement the invention is given in the following appendix.

I claim:

1. An apparatus for measuring gobs of viscous liquid in free-fall, comprising:
   a) a video camera for focusing on a path of the gobs so that the gobs fall through a field of view thereof, said video camera being equipped with an electronic shutter means for capturing a complete two-dimensional, high resolution, frozen video image of an entire gob during a single operation of the shutter means at a single moment in time, wherein the camera is capable of capturing successive complete images of the entire gob representing the path of the entire gob via multiple operations of the shutter means;
   b) a digitizer for digitizing said images to produce n×n pixel arrays; and
   c) an image analyzer for first identifying usable gobs in said arrays and then analyzing said image in a vicinity of said usable gobs on a line-by-line basis to locate edges thereof.

2. An apparatus as claimed in claim 1, wherein said image analyzer comprises a sub-sampler for taking sub-samples of said array and means for identifying the presence of said usable gobs according to predetermined criteria.

3. An apparatus as claimed in claim 2, wherein said image analyzer performs a threshold analysis on said sub-samples to create a bi-level image, and said usable gobs are identified by the presence of a cluster of high level pixels above a predetermined size.

4. An apparatus as claimed in claim 2, wherein outlines of successive gobs are superimposed to permit an operator to observe changes in shape.

5. An apparatus as claimed in claim 2, wherein said image analyzer comprises means for determining the weight of each gob according to the formula:

$$\text{Weight} = K \cdot G_{dens} \int_{y=y1}^{y=y2} \left(\frac{\pi}{4}\right)(\text{Width}(y))^2 dy$$

where
$G_{dens}$ = Density of glass
K = Calibration constant
Width(y) = Width of gob at vertical position y.

6. An apparatus as claimed in claim 5, wherein said means for determining the weight of each gob sums the squares of the widths of the image for each scanning line and determines the weight of each gob in accordance with the formula:

$$\text{Weight} = K \cdot G_{dens} \sum_{y=y1}^{y=y2} \left(\frac{\pi}{4}\right)(\text{Width}(y))^2.$$

7. An apparatus as claimed in claim 2, wherein said image analyzer further comprises means for storing the locations of said gobs as determined from said sub-samples, said stored locations being used to locate valid gobs for carrying out the line-by-line analysis on a full sample when a valid gob is detected.

8. An apparatus as claimed in claim 7, wherein said video camera produces a gray scale image.

9. An apparatus as claimed in claim 8, further comprising a monitor displaying a detected outline of the gobs.

10. An apparatus as claimed in claim 9, wherein the camera is an infrared camera and the intensity of the pixels in a full scale image is mapped to colors, and the images are displayed in false color to show the temperature of different regions of the gobs.

11. An apparatus for producing gobs of viscous liquid, comprising:
    a gob feeder having at least one orifice for producing a stream of viscous liquid, said orifice being associated with shears to sever the gobs from the stream so that the gobs fall freely therefrom;
    means for controlling the size of the gobs emerging from the gob feeder;
    a video camera for focusing on a path of a gob so that the gob falls through the field of view thereof, said video camera being equipped with an electronic shutter means for capturing a complete two-dimensional, high resolution, frozen video image of an entire gob during a single operation of the shutter means and at a single moment in time, wherein the camera is capable of capturing successive complete images of the entire gob representing the path of the entire gob via multiple operations of the shutter means;
    a digitizer for digitizing said images to produce n×n pixel arrays;
    an image analyzer for identifying usable gobs in said arrays and analyzing said image in a vicinity of said gobs on a line-by-line basis to locate edges thereof, said image analyzer comprising means for producing a weight signal representing the weight of each gob according to the formula:

$$\text{Weight} = K \cdot G_{dens} \int_{y=y1}^{y=y2} \left(\frac{\pi}{4}\right)(\text{width}(y))^2 dy$$

where
 $G_{dens}$ = Density of glass
 K = Calibration constant
 Width(y) = Width of gob at vertical position y, and
 wherein said size controlling means is responsive to said weight signal to maintain the gob weight at a desired value.

* * * * *